US012808697B2

(12) United States Patent
Schemmann

(10) Patent No.: US 12,808,697 B2
(45) Date of Patent: Nov. 24, 2026

(54) LOW COST FBG SENSOR SYSTEM

(71) Applicant: Marcel F Schemmann, Maria Hoop (NL)

(72) Inventor: Marcel F Schemmann, Maria Hoop (NL)

(73) Assignee: Foce Technology International BV, Maria-Hoop (NL)

( * ) Notice: Subject to any disclaimer, the term of this patent is extended or adjusted under 35 U.S.C. 154(b) by 501 days.

(21) Appl. No.: 18/262,642

(22) PCT Filed: Jan. 25, 2022

(86) PCT No.: PCT/IB2022/050609
§ 371 (c)(1), (2) Date: Jul. 24, 2023

(87) PCT Pub. No.: WO2022/157740
PCT Pub. Date: Jul. 28, 2022

(65) Prior Publication Data

US 2024/0401988 A1 Dec. 5, 2024

Related U.S. Application Data

(60) Provisional application No. 63/141,209, filed on Jan. 25, 2021.

(51) Int. Cl.
*G01D 5/353* (2006.01)
*G01K 11/3206* (2021.01)
*G01L 1/24* (2006.01)

(52) U.S. Cl.
CPC ..... *G01D 5/35316* (2013.01); *G01K 11/3206* (2013.01); *G01L 1/246* (2013.01)

(58) Field of Classification Search
None
See application file for complete search history.

(56) References Cited

U.S. PATENT DOCUMENTS 6,640,647 B1 * 11/2003 Hong ................. G01D 5/35316 250/227.27
8,208,767 B2 * 6/2012 Duncan ................... E21B 47/06 385/12
2008/0106745 A1 5/2008 Haber et al.
(Continued)

OTHER PUBLICATIONS

Zhang et al., "A large capacity sensing network with identical weak fiber Bragg gratings multiplexing," National Engineering Laboratory for Next Generation Internet Access System(HUST), Feb. 26, 2012, Wuhan, China 430074 (Year: 2012).*
(Continued)

*Primary Examiner* — Jerry Rahll
(74) *Attorney, Agent, or Firm* — Carnelian Law, LLC

(57) ABSTRACT

Techniques for placement of fiber Bragg grating offsets result in interference that causes a ripple in the measured reflectivity from an fiber Bragg grating, with a period substantially shorter than the full width at half maximum value of the fiber Bragg grating to measure. This enables low-pass filtering of the measured grating reflectivity as a function of wavelength, such that the ripple may be suppressed without loss of information of fiber Bragg grating reflection peak position. Ghost intensity due to grating re-reflections may also be estimated from the ripple.

20 Claims, 6 Drawing Sheets

(56) References Cited

U.S. PATENT DOCUMENTS

| | | | | |
|---|---|---|---|---|
| 2012/0201656 A1* | 8/2012 | Johnston | G01M 5/0091 | 356/73.1 |
| 2016/0242653 A1* | 8/2016 | Rourke | A61B 5/0095 | |
| 2021/0293636 A1* | 9/2021 | Kim | G01L 3/12 | |

OTHER PUBLICATIONS

Guo Huiyong et al: "Crosstalk and Ghost Gratings in a Large-Scale Weak Fiber Bragg Grating Array", Journal of Lightwave Technology, IEEE, USA, vol. 35, No. 10, May 15, 2017 (May 15, 2017), pp. 2032-2036.

PCT/IB2022/050609 International Search Report Mar. 25, 2022.

PCT/IB2022/050609 Written Opinion of the International Searching Authority Mar. 25, 2022.

NPL, Lou et al, Online reflectivity measurement of an ultra-weak fiber Bragg grating array, The National Engineering Laboratory for Fiber Optic Sensing Technology, Aug. 27, 2013, Wuhan University of Technology, People's Republic of China.

NPL, Zhang et al., A large capacity sensing network with identical weak fiber Bragg gratings multiplexing, National Engineering Laboratory for Next Generation Internet Access System (HUST), Feb. 26, 2012, Wuhan, China 430074.

PCT/IB2022/050609_FSP1957PCT_IPRP_Jul. 20, 2023.

PCT/IB2022/050609_FSP1957PCT_Prelim IPRP report_Aug. 15, 2023.

* cited by examiner

LOW COST FBG SENSOR SYSTEM

CROSS-REFERENCE TO RELATED APPLICATIONS

This application claims priority and benefit under 35 U.S.C. 371 of PCT Application Serial No. 2022/050609, titled "FIBER BRAGG GRATING SENSOR SYSTEM", filed on 25 Jan. 2022, the contents of which are incorporated herein by reference in their entirety. PCT Application Serial No. 2022/050609 claims priority and benefit of U.S. Application Ser. No. 63/141,209, titled "LOW COST FBG SENSOR SYSTEM", filed on 25 Jan. 2021, the contents of which are incorporated herein by reference in their entirety.

BACKGROUND

One or more Fiber Bragg Grating (FBG) me be imprinted into a glass fiber for use as a temperature or strain sensor. This forms a small section of fiber (usually on the order of a few mm in length) wherein light is reflected by the FBGs at a specific wavelength determined by the imprint process. The reflectivity dependency on wavelength may be approximately modelled by a bell curve, for instance a Gaussian curve with a center wavelength and width. The center wavelength of this bell curve is temperature dependent (and also dependent on strain in the fiber), so that temperature and/or strain at the location of the FBG in the fiber may be determined with the use of a light source, detectors, and processing logic to determine the center wavelength.

In one type of sensor, laser light is transmitted down the fiber and the primary reflection of that light is measured. The wavelength of the light source is varied, and/or the detector resolves and measures reflected light at different wavelengths, to determine the center of the bell curve. Preferably the bell curve has a narrow width (e.g., ~0.1 nm) so that the center may be determined with adequate precision for the application, for example better than 0.1 nm (corresponding to just under 10 °C of temperature precision).

In systems with long fiber lengths, hundreds or thousands of FBGs may be present in the fiber. Light injected into the fiber is reflected by each of the FBGs. The reflectivity of each FBG is configured low enough that the furthest FBG from the light source receives sufficient injected light to generate a detectable primary reflection.

Light pulses are injected into the optical fiber, and the detector monitors the reflected signals as a function of time. The delay of the arrival of the primary reflection is a measure of the distance of a particular FBG from the light source or detector or both. The system may thus distinguish between the different FBGs imprinted along the fiber to, for example, map temperature along the length of an electrical cable to which the fiber is thermally coupled.

Due to the presence of a large number of FBGs along the fiber, primary reflections by any particular FBG may be re-reflected by preceding FBGs (those closer to the light source), and then re-reflected again by other downstream FBGs, and so on, before reaching the detector. Some of this re-reflected light arrives at the detector in overlapping time interval(s) with the primary reflections of one or more other FBGs. At the detector, the re-reflected light interferes with the primary reflections and degrades the signal-to-noise-ratio of the received signal, complicating the determination of the center wavelength. In practice this is a limiting factor for system performance.

Conventionally, in order to reduce this interference, the individual FBG reflectivities are configured below the theoretical optimum values. The re-reflected signal intensity drops as the third power of individual FBG reflectivity, while the FBG primary reflection intensity drops linearly. Dropping the reflectivity of the FBGs thus improves the ratio between primary reflection strength and re-reflection interference strength. However, to be effective, the individual FBG reflectivities may need to be reduced to such an extent that the primary reflection strength at the receiver is degraded beyond an acceptable degree.

The linewidth of a laser, e.g. a mono-frequency laser, is the width (typically the "full width at half-maximum", FWHM) of its optical spectrum. Linewidth therefore refers to the width of the power spectral density of the emitted electric field of the laser, in terms of frequency, wavenumber, or wavelength. One conventional approach to addressing the effects of re-reflection interference involves broadening the linewidth of the laser light source. This however makes the system more complex and/or expensive. Another conventional approach is to increase the distance between FBGs along the fiber, but this reduces the spatial precision of the sensor.

The challenges of mitigating the effects of interference while maintaining precision thus lead to complex and/or expensive optical fiber sensors or degraded performance, especially at medium and large scales.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

There is a long felt need in the market for lower-cost readout capabilities for cable temperature sensing. Embodiments of such systems are described that utilize a temperature-tuned, directly-modulated laser as a pulse source, and a common and conventional photodiode as a receiver. The system may operate with practically-available laser linewidths, pulse widths, and receiver bandwidth, including the bandwidth of the data acquisition system, and the laser wavelength tuning range and rate. In temperature and strain monitoring applications, the speed at which readout is achieved may be acceptably lower than for more time-critical applications.

Figure 8:
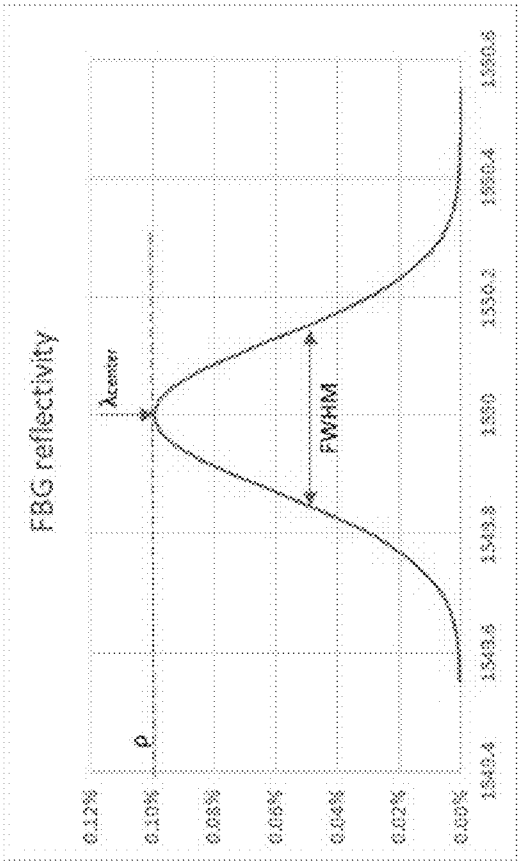
FIG. 8 depicts an example of Fiber Bragg Grating reflectivity characteristics.

An FBG has characteristics including a reflectivity ρ, a center wavelength $\lambda_{center}$ and a full width at half maximum (FWHM) of a reflectivity bell curve, as depicted by the example in FIG. 8.

Through a combination of selective FBG reflection bell curve width adjustment, FBG positioning in the fiber, and wavelength resolution at the receiver, interference effects may be substantially or effectively obviated by post-acquisition data filtering. A result is an estimate for a bell curve of a primary FBG reflection to be measured. Interference present in the detected signal may be applied to estimate a re-reflected power bell curve that in turn may be applied to further correct the primary FBG reflection results. Mechanisms for establishing the functional relation between FBG reflection bell curve width and grating offset step size and wavelength sampling step size are also described.

In a low cost system, the generation of a very short laser pulse (<100 ps) utilizing a low cost, directly modulated laser is a challenging problem. As a consequence, in such a system, the timing separation of a primary pulse generated by the laser, and re-reflected pulses from FBGs imprinted in the fiber, is not complete, and interference will occur at the detector/receiver. A new design of FBG placement offsets is introduced where the interference causes a ripple in the measured reflectivity from an FBG, with a period substantially shorter than the FWHM of the FBG to measure. This permits low-pass filtering of the measured grating reflectivity as a function of wavelength, such that the ripple may be suppressed without loss of information about the FBG reflection peak position. Ghost reflection intensity may also be estimated from the ripple.

The disclosed sensor systems employ a trade-off between FBG reflection bell curve width and offsets in FBG placement. The systems are configured with a novel relationship between FBG reflection bell curve width, grating offset step size, and wavelength sampling step size. In such systems, interference effects from re-reflections may be substantially obviated by post-acquisition data filtering, resulting in a bell curve estimate of a primary FBG reflection to be measured. The interference present in the detected signal may be utilized to estimate a re-reflected power bell curve that is applied to adjust/correct the primary FBG reflection result.

In order to use the theoretical optimum FBG reflectivity a method is needed to reduce the interference due to re-reflections. This is achieved by deliberately off-setting grating positions such that most re-reflections arrive at a time slightly off-set from the FBG reflection to read out. When a short duration laser pulse is used it may prevent interference. However for position offsets under 1 cm the laser pulse would need to be less than 100 ps wide (the roundtrip time on 1 cm of fiber length) to avoid overlapping of light arriving from the grating and light arriving from a re-reflection with a delay offset. 100 ps in flight time equates to 1 cm roundtrip distance on fiber. Externally modulated lasers can provide this pulse width (equivalent to what is utilized in a 10 Gb/s data transmission system), but at a trade-off of complexity, extinction ratio (meaning the light does not fully turn off causing further system noise problems) and notably cost. Here it is intended to find a solution that permits a design with a low cost directly modulated laser and therefore pulse widths in the 0.5-10 ns range may be utilized. This means that interference of light with path differences up to the 5 cm-1 m (roundtrip that is 10 cm-2 m) may occur.

As will be shown, this is achieved by deliberately off-setting grating positions such that most re-reflections arrive at a time slightly off-set from the primary FBG reflection to read, and then reading them out with a wavelength step designed such that a high frequency ripple is generated in the readout values superimposed on the grating reflection curves. This ripple is subsequently filtered out. The ripple rate (as a function of wavelength) is proportional to the distance difference between FBG reflection distance and interfering re-reflection distance such that a distance can be chosen such that this rate is sufficiently high to be filtered out of the primary FBG reflectivity versus wavelength data without affecting the primary reflection result. To accomplish this, the shape of the grating reflectivity as a function of wavelength needs to be sufficiently smooth such that it can be differentiated from the ripples. A relation will be derived between grating FWHM and distance offset step to separate ripple from grating reflectivity curve. Also, a relation will be derived for maximum wavelength step (sampling theorem) to resolve the ripples to a sufficient degree to permit the filtering process. Whereas most of this analysis is based on FFTs, data filtering may take place with any filter such as FIR or IIR filters.

The optimum reflectivity $RL_R$ of the last (most distal from the source of injected light) FBG along a fiber with N total FBGs, each with optimum reflectivity R, is:

$$RL_R(N) = \frac{1}{2N-1}\times\left(1-\frac{1}{2N-1}\right)^{2(N-1)}$$

where the reflectivity of a grating at position N is:

$$R(N) = \frac{1}{2\cdot N-1}$$

The intensity of reflections decreases at a cubic rate of a grating's reflectivity. When there are a number K of Fiber Bragg Gratings along the fiber each comprising approximately equal reflectivity ρ, then at the detector the re-reflections contribute interference noise of an intensity $I_s\rho^3(1-\rho)^{2(K-2)}$, where $I_s$ is the intensity of the light pulse injected into the fiber. The estimated ratio $RAT_3$ between the signal of interest and unwanted noise at the detector, as a function of FBG reflectivity ρ and a number K of FBGs is therefore:

$$RAT_3(\rho, K) = \frac{1-\rho}{\rho\cdot\sqrt{(K-2)(K-1)}}$$

For a large value of K (many FBGs) and typical FBG optimum reflectivity values, the signal to noise ratio (SNR) at the detector is therefore limited to around a value of 2.0.

To utilize FBGs having the theoretical optimum grating reflectivity, it is therefore desirable to reduce the interference caused by re-reflections. Mechanisms are disclosed herein to accomplish this by deliberately off-setting FBG positions along the fiber such that most re-reflections arrive at a time slightly off-set from the primary FBG reflection to read out.

Fiber Bragg Grating positions along a fiber may be offset from one another such that most re-reflections arrive at the detector a time slightly off-set from any particular primary FBG reflection to read. The readout at the detector may be carried out with a wavelength step selected such that a high frequency ripple is generated in the readout values superimposed on the FBG reflection curves. This ripple is subsequently filtered out. The ripple rate (as a function of wavelength) is proportional to the difference between FBG primary reflection distance and interfering re-reflection distance. A distance may be chosen such that this rate is sufficiently high to be filtered out of the primary FBG reflection versus wavelength data without affecting the primary reflection result.

If the reflectivity of an FBG as a function of the wavelength (in nanometers nm) of incident light is $$R(\lambda, \sigma) = \frac{1}{\sqrt{2\pi\sigma^2}} \cdot e^{\frac{-\lambda^2}{2\sigma^2}}$$

and the FWHM of the grating reflection as a function of σ is FWHM(σ)=2.335σ (nm), then the Fourier Transform of the grating reflectivity function is $$H(f, \sigma) = e^{-2\pi^2\sigma^2 f^2}$$

where η is in units of nm. The frequency at which the amplitude of the FBG reflectivity decreases by a factor H (relative to a normalized amplitude value of 1) is therefore $$f(H, FWHM) = \frac{\sqrt{-\ln(H)}}{\sqrt{2} \cdot \pi \cdot \left(\frac{FWHM}{2.335}\right)} \quad \text{Equation 1}$$

It follows, for example, that performing a measurement of reflectivity as a function of wavelength, and filtering to remove signal content at a rate above 4.6 per nm (for the example of a 0.3 nm FHWM grating) then an insubstantial amount information is lost from the grating reflectivity curve. It further follows that when re-reflections cause ripples at higher rates, the filter removes perturbations arising from those re-reflections without significantly degrading the primary reflection measurements for the gratings. For a particular FBG, the ripple induced by re-reflections is preferably above a rate given by Equation 1 (where H may be chosen between, for instance, 1/10 and 1/1000) such that the primary reflection signal for the grating may pass the filter without substantial degradation.

The ripples resulting from the product of multiple FBG reflections interfering with the primary FBG intensity peak do not manifest as well-defined continuous wave functions. Instead, the ripples have an envelope with a finite width as a function of wavelength. They thus have a finite width as a function of rate, post Fourier transformation. Significant overlap between a low frequency tail of the transformed interference signal and a high frequency tail of the transformed grating reflectivity function should therefore be avoided, so that the filter is enabled to distinguish and separate said tails.

Figure 1:
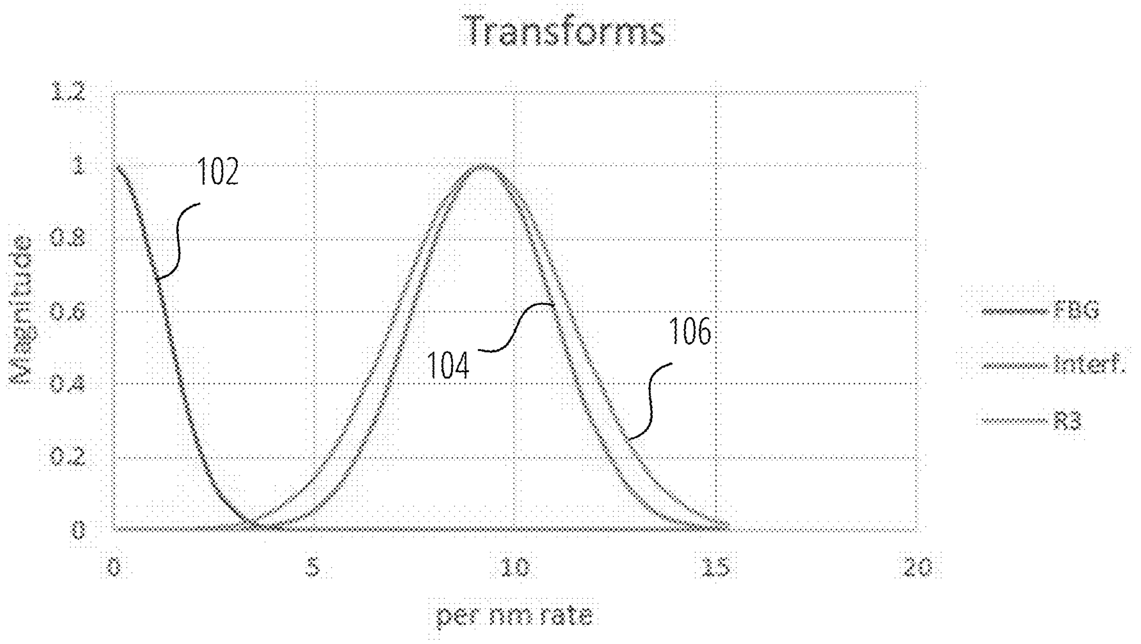
FIG. 1 depicts an example of amplitude overlap of the transforms of the primary FBG reflection and the re-reflection interference.

In the frequency domain, the spectral width of the product of a re-reflected signal mixing with the primary FBG signal results in a width that is a factor $\sqrt{2}$ wider than that of the primary FBG signal. When the delay of primary FBG signal and that of re-reflected signal are identical, the spectra mostly overlap. However, the spectrum of the interference due to re-reflection may be shifted when there is a delay difference between the primary FBG reflection path and re-reflected signal path. An example is of amplitude overlap of the transforms of the primary FBG reflection signal transform 102 and the re-reflection interference signal transform 104 is depicted in FIG. 1 for a shift of 9.2 per nm, corresponding to a distance difference of 0.7 cm (1.4 cm roundtrip difference of light on the fiber). Also shown for reference is the transform amplitude of the triple reflection signal transform 106 in the re-reflection path (without accounting for the interference). The bell curve amplitudes are normalized in FIG. 1, but in reality the primary FBG reflection has the highest amplitude, followed by the interference signal.

An FBG inter-offset distance Δd (herein, step size) determines the minimum offset for re-reflection interference transform (e.g., FFT) results from primary FBG reflection transform (e.g., FFT) results. The disclosed systems utilize a minimum Δd for a given grating FWHM. For a FBG reflection transform and re-reflection transform pair, the overlapping tails become a significant factor. This may necessitate an increase of the spacing between the transformed results, for instance to a factor $1+\sqrt{2}$ wider than that of the primary FBG signal, so that both tails are below a required suppression factor HA:

$$f(HA, FWHM) = \frac{(1+\sqrt{2}) \cdot \sqrt{\ln(HA)}}{\sqrt{2} \cdot \pi \cdot \left(\frac{FWHM}{2.335}\right)} \quad \text{Equation 2}$$

An SNR of 10 may be obtained with a factor 5× improvement over the SNR 2 floor level described above for an optimum FBG reflectivity setting, by rejecting ripple using a low pass filter. This requires a minimum grating step size corresponding to HA=5. The SNR is inversely proportional to grating reflectivity p and one approach to improving SNR is to reduce grating reflectivity even though this comes at a cost of reduced primary reflection intensity at the detector. Also signal intensity may be enhanced by using a higher pulse power in the system, but it may be preferable to use a low cost directly modulated laser where pulse power is limited. Therefore, preferably, the individual grating reflectivity is no less than half the optimum grating reflectivity for the system, so that the SNR limited by interference is approximately 4, and suppression of ripple by filtering preferably enhances this by a factor 3×, so that HA≥3. The ripple period for a given suppression factor HA is given by:

$$\lambda_{per}(HA, FWHM) = \frac{0.788 \cdot FWHM}{\sqrt{\ln(HA)}} \quad \text{Equation 3}$$

Table 1 below provides example of ripple periods for different systems with gratings comprising a reflection bell curve FWHM, where the ripples are induced by interference between a primary grating reflection and at least part of re-reflections present in the system.

| $\lambda_{per}$ | HA | Example |
|---|---|---|
| <0.75*FHWM | 3 | $\lambda_{per}$ = 0.23 nm, FWHM = 0.3 nm |
| <0.62*FHWM | 5 | $\lambda_{per}$ = 0.19 nm, FWHM = 0.3 nm |
| <0.37*FHWM | 100 | $\lambda_{per}$ = 0.11 nm, FWHM = 0.3 nm |

The required step size in FBG spacing is inversely proportional to the FBG FWHM. This means that FBG spacing becomes more coarse when gratings with narrower reflection peaks are utilized. This is undesirable in a system applied to sense for instance cable temperature at equi-spaced intervals. Variations in grating locations, different from an equi-spaced embodiment, lead to a variation in the spatial resolution of temperature sensing of the cable. Where variations in FBG inter-spacing is utilized to obtain the desired ripple frequencies in the interference patterns, preferably such variation is constrained (e.g., to less than 20% of some configured nominal spacing) to maintain a nominal sensing resolution along the length of the cable. Nominal spacing refers to some value of the FBG spacing against which the variation percentage is computed.

For this reason, an overly-narrow FWHM (e.g., 0.1 nm) may not result in the desired system behavior. A wider FWHM may be preferred (e.g., 0.3 nm) to permit a smaller step size in FBG spacing. A wider FWHM also enables more freedom to vary FBG spacings around their nominal values to prevent a significant build-up of an interference pattern that cannot be filtered out. Variation in the nominal FBG may not be necessary in systems in which utilizing a constant FBG step size improves the measurement of one or a few primary FBG reflections by ensuring the interference has a ripple frequency high enough to be filtered out. However, in some systems, a constant FBG step size may cause the measurement of some FBG primary reflections to suffer from interference that falls directly on the primary FBG reflection in such a way that it cannot be filtered out. Variation in the FBG step size, in conjunction with a sufficiently large step size may ameliorate this problem, although the number of step size values utilized in a given scheme may be limited by the maximum deviation from nominal spacing and the minimum step size utilized.

Figure 4:
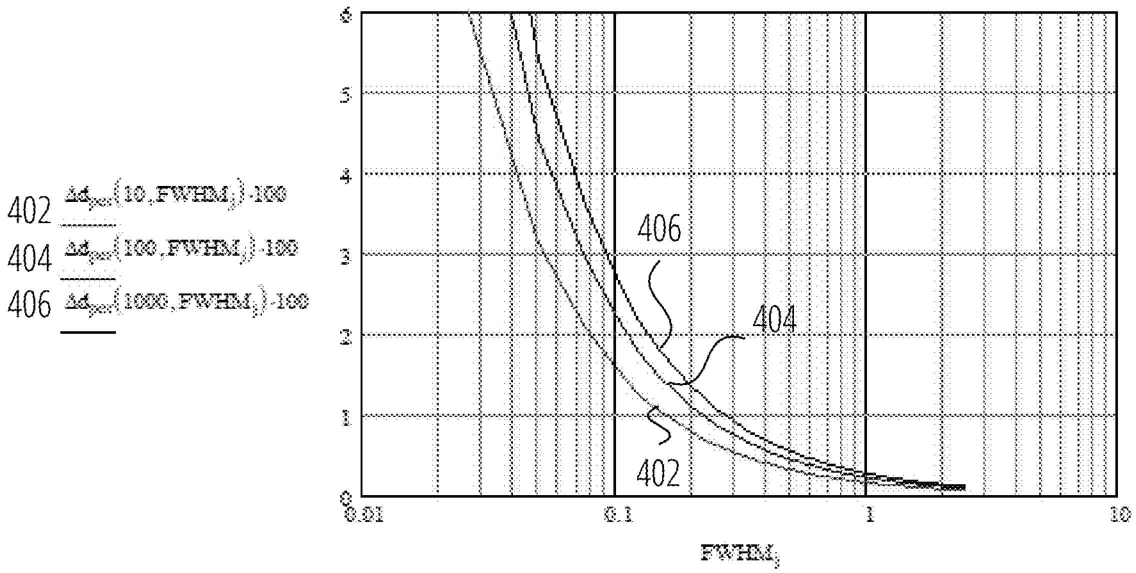
FIG. 4 depicts minimum steps sizes for FBG placement for HA=10 (lower curve 402), HA=100 (middle curve 404), and HA=1000 (upper curve 406).

Assuming light speed propagation on the fiber and a wavelength of 1550 nm, where the optical frequency shifts by 100 GHz per 0.8 nm, the minimum step size may be derived from Equation 2 and Equation 3 as follows:

$$\Delta d_{per}(HA, FWHM) = \frac{0.5 \cdot c}{n_0 \cdot 10^9} \cdot \frac{2.335 \cdot (1+\sqrt{2}) \cdot 0.8\sqrt{\ln(HA)}}{\sqrt{2} \cdot \pi \cdot 100 \cdot FWHM} = 1.027 \times 10^{-3} \cdot \frac{\sqrt{\ln(HA)}}{FWHM} \quad \text{Equation 4}$$

where c is the speed of light and refractive index $n_0$ is 1.5 in glass. FIG. 4 depicts minimum steps sizes for FBG placement for HA=10 (lower curve 402), HA=100 (middle curve 404), and HA=1000 (upper curve 406).

In one embodiment, $\Delta d_{per}$ is >1.1/FWHM; in another embodiment, $\Delta d_{per}$ is >1.3/FWHM; and in yet another embodiment, $\Delta d_{per}$ is >2.2/FWHM.

Figure 2:
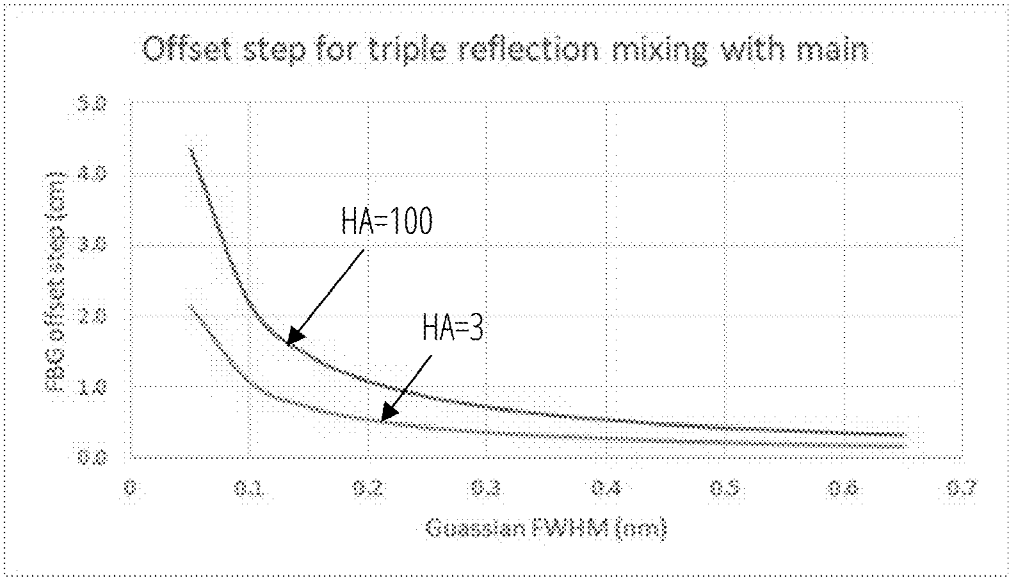
FIG. 2 depicts characteristic curves for a minimum FBG step size vs grating FWHM, for systems in which for HA=3 and HA=100.

FIG. 2 depicts characteristic curves for a minimum FBG step size vs grating FWHM, for systems in which for HA=3 and HA=100. Narrower FBG reflection spectra (FWHM) are more detrimental to the freedom of choice in (near constant) FBG step size along the fiber. Smaller minimum step sizes provide for increased combinations of step sizes (in variable step size systems) to mitigate the build-up of FBG re-reflections. The more the re-reflection delays are spread out, the more thoroughly the induced ripples in the received signal to wavelength response can be filtered out without degrading the received primary FBG reflection signal. For example, where FWHM is 0.3 nm and HA=100, $\Delta d_{per}$=0.735 cm.

Figure 3:
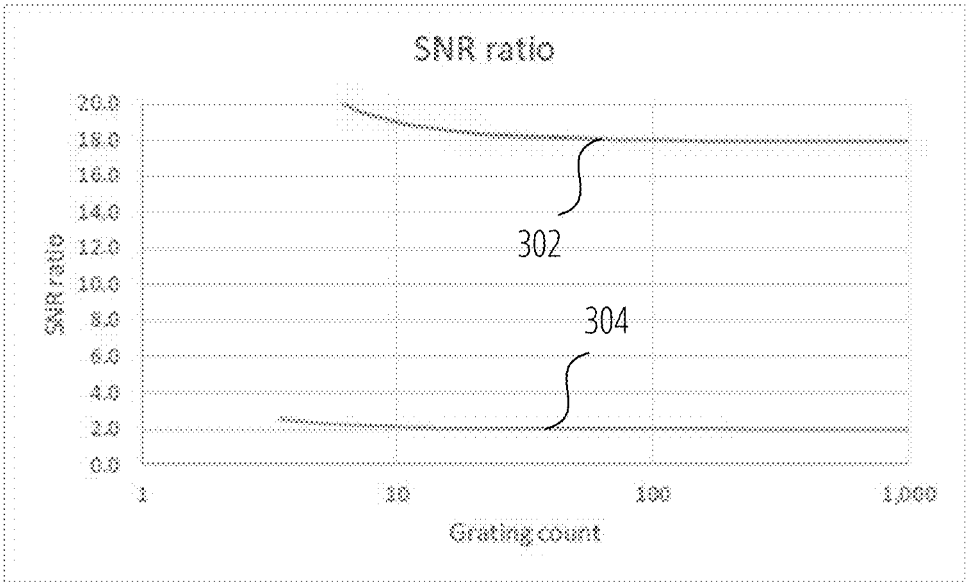
FIG. 3 depicts SNR characteristics for systems utilizing the disclosed techniques compared with the SNR in conventional systems.

This is an example of a ripple period variation that is small enough to enable a significant number of combinations of FBG step size variations. For a nominal FBG step size of 0.5 meter, a ±20% variation of sampling resolution would tolerate a 20 cm range to select grating spacing, therefore well over 20 options are available to select a spacing. With a large number of gratings, such as 500, not all gratings may have a different spacing from one another, given this step size and the number of options available. In one embodiment the inter-FBG step size differs from at least 80% of the other inter-grating step sizes by an amount equal to at least $\Delta d_{per}$ for HA=3, and preferably HA=5 and if possible HA=100. This enables for example five (5) groupings of FBGs along the fiber, each grouping having constant internal inter-FBG step size, but each grouping having a different inter-FBG step size from any another group. FIG. 3 depicts SNR characteristics for improved system SNRs 302 utilizing these techniques, compared with conventional system SNRs 304. The characteristics are depicted for different grating counts K where each grating is configured to have the optimal theoretical reflectivity $$\rho = \frac{1}{2K-1}.$$

At the detector, the wavelength sampling step size should be configured with sufficient resolution to resolve the structure in the wavelength response. Otherwise, aliasing will occur in the reflectivity and wavelength readings that will not admit removal of ripple terms by low pass filtering. The low-pass filter should be designed to pass enough of the primary FBG reflection spectrum to enable reconstruction of that reflection spectrum. For example, it may be desirable that at least 90% of that spectrum is passed and preferably more than 99%, which translates to a low pass filter cut-off frequency of at least:

$f_{cut\text{-}off}$>0.8/FWHM per nm ripple rate filter cut off (90% pass rate) or preferably:

$f_{cut\text{-}off}$>1.1/FWHM per nm ripple rate filter cut off (99% pass rate)

To limit aliasing, a minimum wavelength sampling rate (maximum wavelength step size when sampling the reflectivity data) may be configured. For example, in order to have less than 20% of the wavelength response transform spectrum folding back within the low pass filter bandwidth, the sampling rate should be (at least) 10 times higher than the sampling rate required to determine the primary FBG reflection (so that the Nyquist frequency of the sampling process is (at least) 5 times the low pass filter cut-off frequency used to pass the primary FBG reflection signal). For example ($\lambda_{step\_smpl}$ is the wavelength sampling period):

$\lambda_{step\_smpl}$<FWHM/8 nm sampling step size, for instance 38 pm for 0.3 nm FWHM;

$\lambda_{step\_smpl}$<FWHM/11 nm sampling step size, for instance 27 pm for 0.3 nm FWHM.

The maximum roundtrip distance difference between re-reflections that interfere at the receiver is also determined by the laser pulse width. This results in a Nyquist sampling rate (in nm, with Δd in cm and $T_{pulse}$ in ns) of: $\Delta\lambda_s=0.04/\Delta d=0.004/T_{pulse}$. This is a preferred sampling step size in one embodiment, for example 1 pm for a 4 ns pulse.

The FBG placements along the fiber may thus be configured such that a small wavelength shift changes the constructive and destructive interference pattern for the reflectivity generated from an FBG. This generates a ripple in the measured reflectivity from the FBG, with a period substantially shorter than the FWHM of the FBG being measured. This enables low-pass filtering of the measured FBG reflectivity as a function of wavelength, such that the ripple may be suppressed without loss of information about the FBG reflection peak position. Practical laser pulse widths, wavelength scanning rates, and pulse repetition rates may be utilized, reducing system complexity and cost.

Utilizing the mechanisms disclosed herein, the FBG re-reflections are positioned such that when the primary FBG reflection is read out, the re-reflections cause an interference with a wavelength-dependent ripple, where the ripple rate is high enough to be rejected by applying a low pass filter to the measured signal. Because the ripple is primarily the result of the re-reflection field mixing with the primary FBG reflection field, and the primary FBG reflection field is approximately known, the re-reflection field amplitude may be estimated from the ripple magnitude, as depicted for example in FIG. 5. The detector is sampled with a sufficiently small wavelength step to determine the ripple magnitude. This permits an estimation of the ghost reflection present due to the FBG re-reflections that is not reflected by the low pass filter. An example result is shown below wherein the ghost reflection is determined based on the ripple of the re-reflected signal so that the measurements may be corrected for this ghost reflection.

Figure 5:
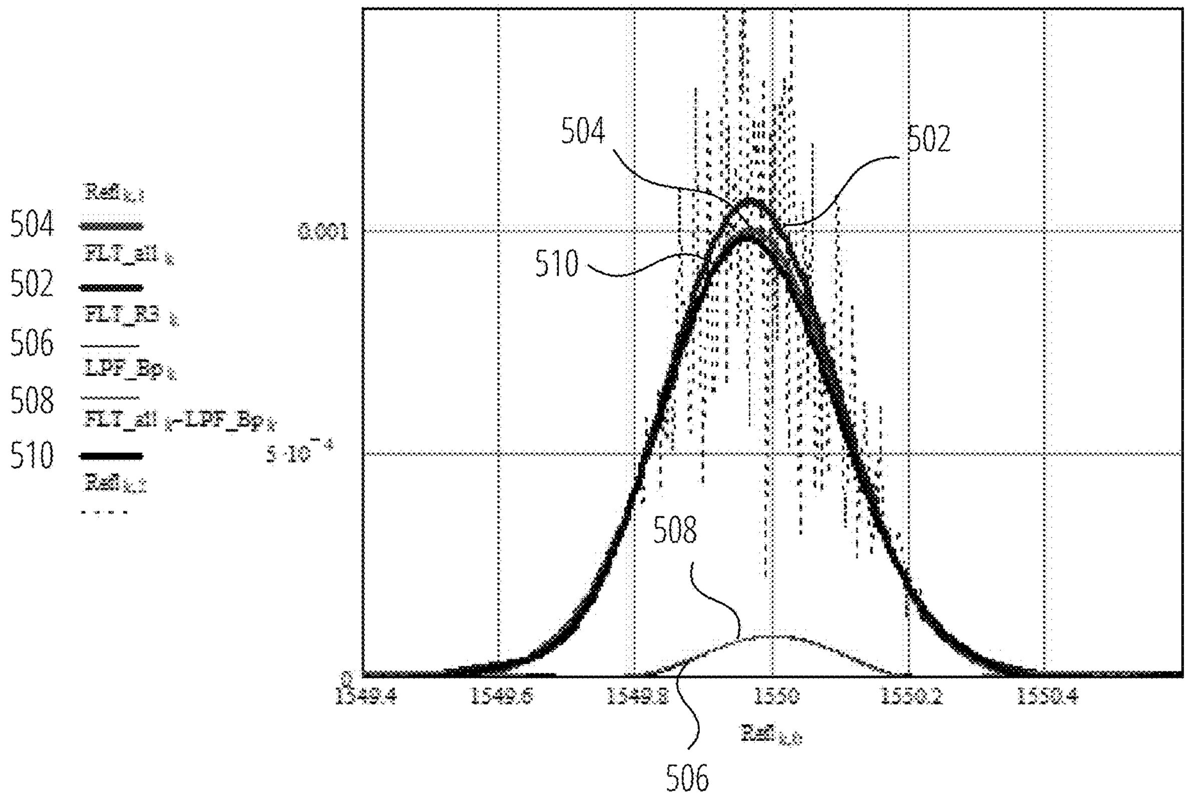
FIG. 5 depicts an example of reflection power curves.

In FIG. 5, the dotted lines are the detected power including high-frequency ripple. The low pass filtered output from the detector is depicted by curve 502. This is compared to the unperturbed (re-reflections not present) primary FBG reflection in curve 504. A comparison of curve 502 and curve 504 indicates the presences of an additional power component present due to the re-reflection signal power. The low-pass filtered detector output due to the re-reflection power is shown in curve 506 (actual power found by computing the re-reflected signal power without the primary reflection). This is an FBG reflection ghost. It is compared to the estimate generated by using the high frequency ripple information, depicted in curve 508. Clearly the estimate closely follows the actual ghost. The low pass filtered detector output is corrected for the ghost and the result is shown in curve 510, which is close to the actual primary FBG reflection curve (curve 504). Curve 504 and curve 510 are not a perfect fit due to the fraction of re-reflections that is not off-set from the primary FBG reflections, resulting in a small remainder of interference that cannot be filtered out by the low pass filter. This remainder is a relatively small and tolerable fraction of the FBG re-reflections; the bulk of FBG re-reflection interference ripples is filtered out and in addition the bulk of FBG re-reflection ghosting due to the average power of the re-reflections is also removed.

Figure 6:
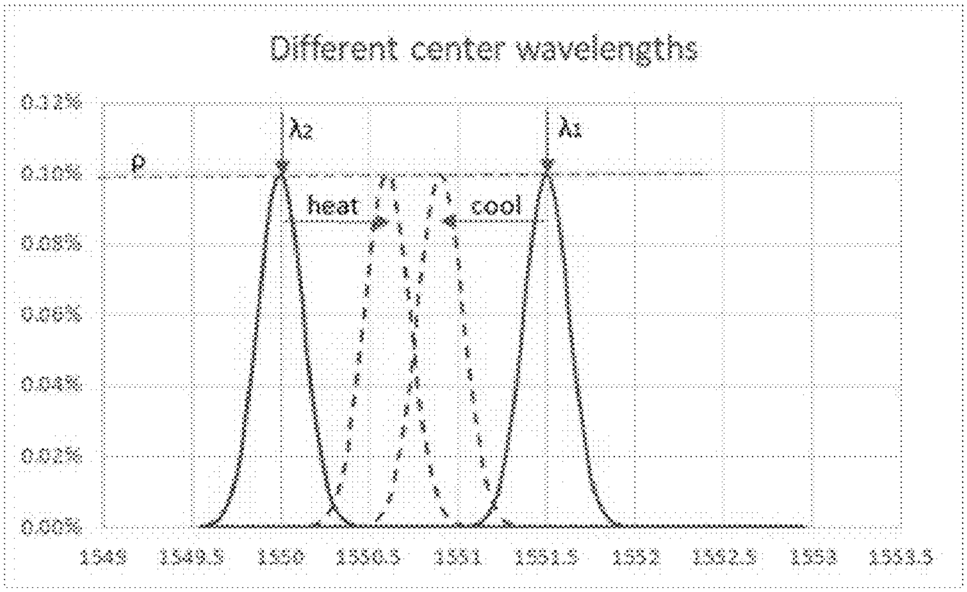
FIG. 6 depicts an example of variable center wavelengths among the Fiber Bragg Gratings.

The center wavelengths of the FBGs utilized in the system may also be varied-see for example FIG. 6. The separation between the center wavelengths should be sufficient to avoid overlap even when the center wavelengths are shifted by, for instance, temperature or strain over the required measurement range. In such a system, re-reflections between gratings of different center wavelength do not occur. However, the separation in wavelengths needs to be relatively large and only a few center wavelengths may be assigned for a readout system with a limited wavelength tuning range, such as a cost-effective thermally-tuned laser. Thus, a system could include a plurality of sets of gratings, each set with a different center wavelength by design, and re-reflections between gratings from different sets could then be avoided. Each set may be considered an independent set of gratings that have no effect on each other sets, and within each set the rules mechanisms described herein may be applied to suppress the effect of interference due to re-reflections within that set. Thus, the number of gratings in a system may be increased by a factor determined by the number of center wavelengths chosen, this factor being limited by the tuning range of the readout (detection and measurement) system.

In order to enable the use of more variations in center wavelengths among the FBGs along a fiber, under the constraint of a limited wavelength tuning range at the detector, the overlap of grating reflectivity center wavelengths may be enabled under certain measurement conditions. For instance, consider a fiber in which a first grating in the fiber is at a first temperature, and a second grating in the fiber is at a much warmer temperature. At an ambient temperature the two gratings may have a clearly separated center wavelength, but when there's a large temperature difference between them, their center wavelengths shift such that their reflectivity curves overlap.

Under these conditions re-reflections between gratings belonging to different sets may occur and degrade system performance. In particular, this is the case if a first section of fiber has gratings belonging to a first set and a second section of fiber has gratings belonging to a second set. When there's a large temperature difference between gratings in the first section and those in the second section (or vice versa), all grating wavelengths may be shifted such that their center wavelengths become identical. Then a large number of re-reflections between the two sets may occur and system performance would be degraded significantly.

This situation becomes more probable when one part of a cable is rolled up and temperature increases due to self-heating, while another section traverses through a cold outdoor environment.

Figure 7A:
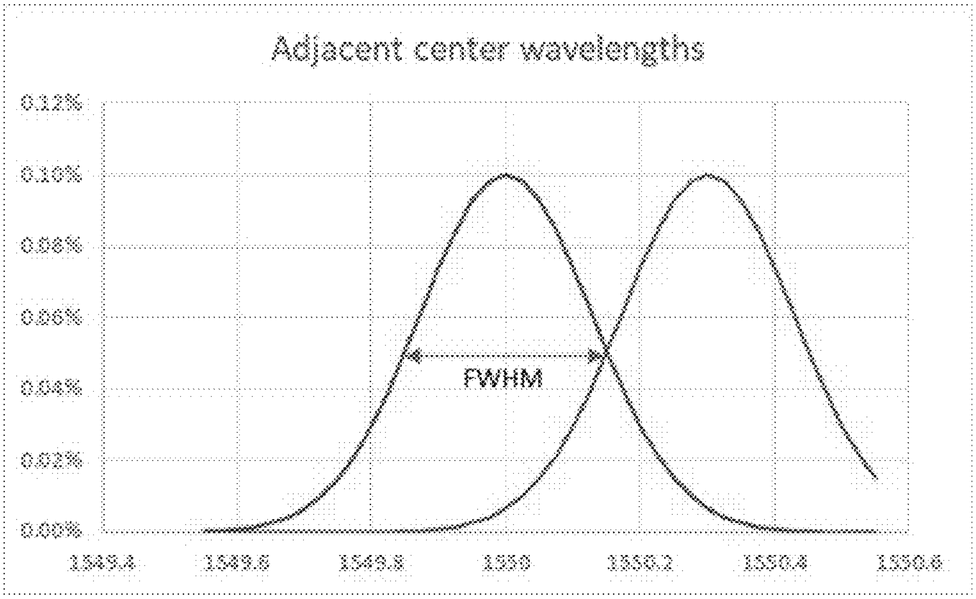
FIG. 7A depicts an example of variable center wavelengths between an adjacent pair of Fiber Bragg Gratings.
Figure 7B:
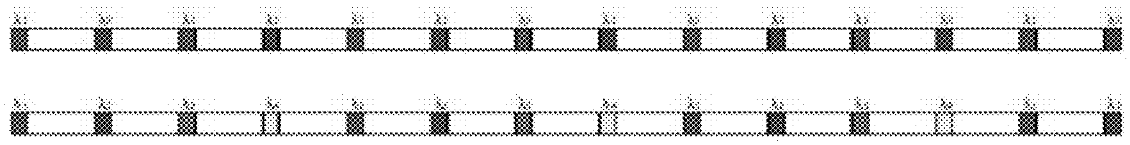
FIG. 7B depicts an exemplary fiber sensor with two or more interleaved sets of gratings with different center wavelengths.

In one embodiment this challenge is addressed by combining gratings with different center wavelengths in an interleaved fashion. See for example FIG. 7B, which depicts an exemplary fiber sensor with two or more interleaved sets of gratings with different center wavelengths.

It is thus advantageous to interleave gratings belonging to different sets of grating center wavelengths by applying a spatial pattern that separates center wavelengths of adjacent gratings. It is statistically unlikely that a temperature (or strain) or measurement profile would match this interleaved pattern over any significant length of cable or fiber. Narrow wavelength spacing may thereby be enabled. See for example FIG. 7A. The separation in center wavelengths may in some embodiments be limited to the FWHM of the gratings, thus ensuring that a large number of center wavelengths are accommodated, even in a system with a limited tuning range. In such a system the grating center wavelengths may still shift to overlap such that a number of re-reflections is increased. However, a system designed in accordance with the mechanisms described herein to detect ripple from interference and filter that interference to determine a grating reflectivity curve, and optionally also estimate re-reflected power, may still correct for the ripple due to these re-reflections and also optionally warn a system operator in case the re-reflection intensity becomes too large.

Figure 9A:
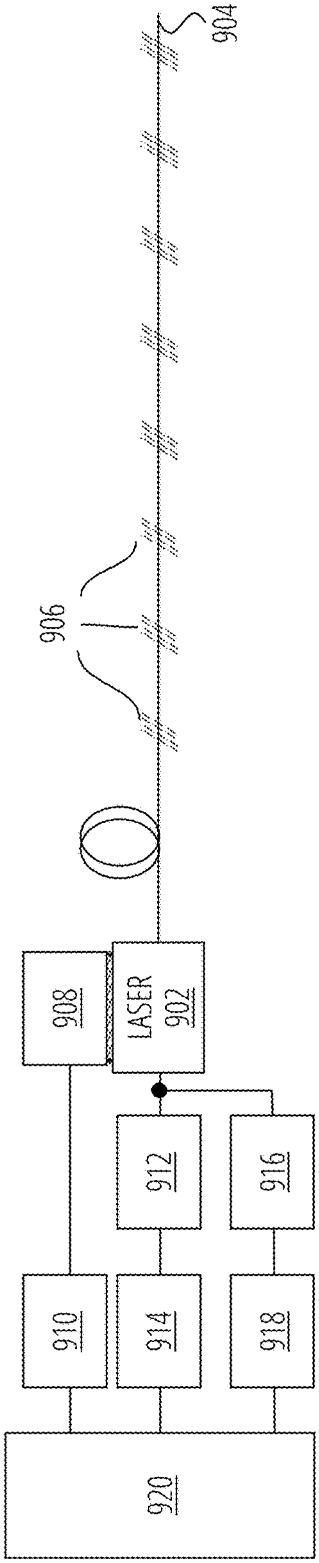
FIG. 9A depicts an optical fiber temperature sensor system in one embodiment.

FIG. 9A depicts an optical fiber temperature sensor system in one embodiment. The system comprises a laser 902 that generates light pulses down an optical fiber 904, along which are imprinted a number of Fiber Bragg Gratings 906. The wavelength of the laser pulses is controlled in this example by a laser cooler 908 driven by a cooler current controller 910. Pulse width and timing is set by a laser bias and pulse current generator 912 driven by a timing generator 914.

Reflections from the Fiber Bragg Gratings 906 are detected by the laser 902 between output pulses. The laser generates out a pulse and then it is reverse biased to operate as a detector for reflections of the pulses. There is no conflict between the time windows for pulse generation and receive operation because the pulse is relatively short (few ns, few 10 cm roundtrip time from a fiber reflection) and reflections tend to come in later unless gratings are attached almost directly to the laser, which is impractical. A current meter 916 detects current generated by the laser (e.g., a laser diode) due to the reflections. The detected value of current is digitized using an analog-to-digital converter 918 and the digital value is provided to the processing and control logic 920, which also operates as an overall controller for the sensor system.

Although the laser 902 may be operated as a detector, it may be preferred to add a dedicated optical detector 922 to the system via an optical coupler 924 on the optical fiber 904. In this case the laser 902 is simply turned off or operated sub-threshold during the detection time window.

Figure 9B:
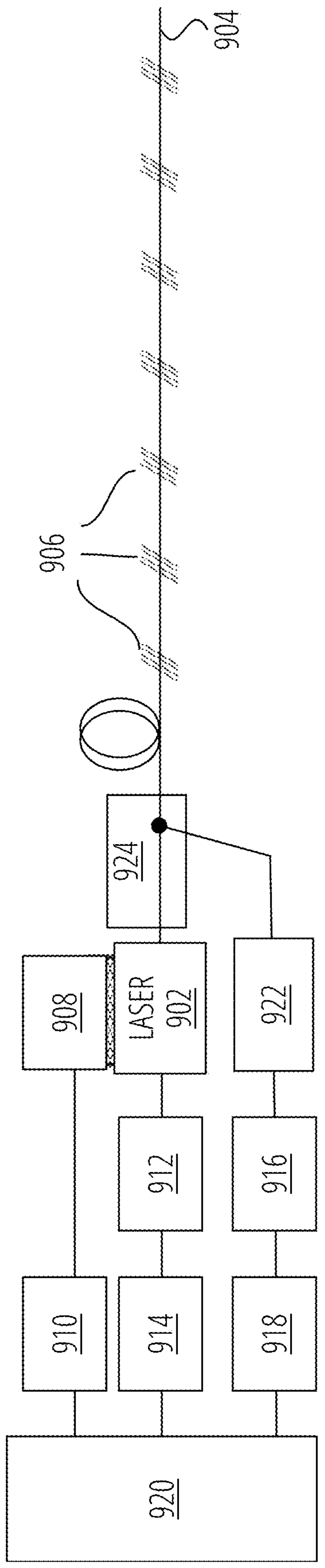
FIG. 9B depicts an optical fiber temperature sensor system in another embodiment.

In systems such as those depicted in FIG. 9A and FIG. 9B, many Fiber Bragg Gratings 906 generate many reflections in response to a laser pulse injected into the optical fiber 904. The reflections each arrive at the optical detector 922 (or laser 902) with a delay (relative to the injected pulse) that is proportional to the distance of the FBG to the laser 902 and/or optical detector 922. The pulse width $T_{pulse}$ is set by the laser bias and pulse current generator 912 to be less than the difference in roundtrip time for reflections between adjacent Fiber Bragg Gratings 906, so that $T_{pulse}<2*d/c_{fiber}$ with grating spacing d and $c_{fiber}$ light speed on the fiber; for a glass index of 1.5 $c_{fiber}=c_{vacuum}/1.5=2e8$ m/s, so that $T_{pulse}<d/1e8$ or 1 ns per 10 cm of grating distance.

Re-reflected light pulses with delays similar to those of primary FBG reflections generate weaker "ghost" reflections in such systems. The power sum of such re-reflections may be estimated when the individual FBG reflectivity (for each FBG as a function of wavelength) and distances along the fiber are known. The FBG nearest to the readout system along the fiber length is not affected by ghost reflections, so that it's reflectivity as a function of wavelength is readily determined. Any ghosting in a measurement for a more distal FBG may be estimated from preceding FBG measurements, so that starting with the first FBG, corrections of measured reflection spectra due to ghosting may be estimated and applied.

A complication arises when interference of the optical field caused by the re-reflections (ghosts) with the primary reflection causes ripples with a much more random behavior of the detector signal. This effect may be a dominant noise source in some medium and large scale systems. Mechanisms to remove this random ripple and recover the primary FBG reflection from the detector signal are the subject of the disclosure herein.

Because FBGs have a wavelength dependent reflection, they also has a wavelength dependent transmission; light that is reflected is not transmitted. The transmittance of light injected into a fiber to an FBG located somewhere in the fiber and reflected back to the detector is affected by the transmittance of all the preceding FBGs in the fiber. These FBG's cast a wavelength-dependent "shade" on the reflection that is measured. When the center wavelengths of the preceding FBGs are known, this "shading" effect can be estimated and corrected for. The first FBG encountered by light injected in the fiber does not suffer from shading and therefore provides a starting point for the correction of shading due to a subsequent FBG in the fiber, and so on. Herein it is assumed that corrections for shading are applied as appropriate for a particular implementation once the random ripple has been removed and the primary FBG reflection signals recovered.

LISTING OF DRAWING ELEMENTS

102 primary FBG reflection signal transform
104 re-reflection interference signal transform
106 triple reflection signal transform
302 improved system SNR
304 conventional system SNR
402 lower curve
404 middle curve
406 upper curve
502 curve
504 curve
506 curve
508 curve
510 curve
902 laser
904 optical fiber
906 Fiber Bragg Grating
908 laser cooler
910 cooler current controller
912 laser bias and pulse current generator
914 timing generator
916 current meter
918 analog-to-digital converter
920 processing and control logic
922 optical detector
924 optical coupler Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C. element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A sensor comprising:

an optical fiber comprising a plurality of Fiber Bragg Gratings;

a low-pass filter; and wherein a FWHM of the Fiber Bragg Gratings and an inter-spacing of the Fiber Bragg Gratings are configured such that primary reflections from the Fiber Bragg Gratings generate a first wavelength-dependent function, and further such that a ripple due to re-reflections between the Fiber Bragg Gratings generates a second wavelength-dependent function, the low-pass filter configured to pass signals satisfying the first wavelength-dependent function and to reject signals satisfying the second wavelength-dependent function; and wherein the inter-spacing of the Fiber Bragg Gratings along the optical fiber is variable, and the Fiber Bragg Gratings are organized into a plurality of sets, each set comprising a same pattern of variable inter-spacing of the Fiber Bragg Gratings.

2. The sensor of claim 1, wherein the first and second wavelength dependent functions each comprise a signal spectrum as a function of wavelength change rate, the signal spectrum of the second wavelength dependent function falling within a wavelength change rate range outside and above a wavelength change rate range of the first wavelength dependent function.

3. The sensor of claim 1, further comprising logic to estimate from the ripple a contribution of the re-reflections to the primary reflection signal and to apply the contribution of the re-reflections to distinguish the primary reflections from the re-reflections.

4. The sensor of claim 1, further comprising a laser configured to inject light pulses into the optical fiber, the light pulses having a width greater than 100 ps and utilizing a wavelength step size less than or equal to an eighth of the FWHM.

5. The sensor of claim 1, wherein both of the inter-spacing of the Fiber Bragg Gratings along the optical fiber and the center wavelengths of the Fiber Bragg Gratings vary.

6. The sensor of claim 1, wherein a center wavelength varies among of the Fiber Bragg Gratings.

7. The sensor of claim 6, wherein a center wavelength is interleaved among of the Fiber Bragg Gratings.

8. The sensor of claim 6, wherein a variability of the center wavelength is limited to the FWHM.

9. A sensor comprising:

an optical fiber comprising a plurality of Fiber Bragg Gratings;

a low-pass filter; and wherein a FWHM of the Fiber Bragg Gratings and an inter-spacing of the Fiber Bragg Gratings are configured such that primary reflections from the Fiber Bragg Gratings generate a first wavelength-dependent function, and further such that a ripple due to re-reflections between the Fiber Bragg Gratings generates a second wavelength-dependent function, the low-pass filter configured to pass signals satisfying the first wavelength-dependent function and to reject signals satisfying the second wavelength-dependent function; and wherein the inter-spacing of the Fiber Bragg Gratings along the optical fiber is variable, and the Fiber Bragg Gratings are organized into a plurality of sets, each set comprising a fixed inter-spacing of the Fiber Bragg Gratings that differs from the fixed inter-spacing of the Fiber Bragg Gratings in other sets.

10. A sensor system comprising:

a laser light source;

an optical fiber comprising a plurality of Fiber Bragg Gratings, the optical fiber configured to receive light pulses from the laser light source;

each of the Fiber Bragg Gratings characterized by a reflectivity spectrum comprising a Full Width Half Maximum (FWHM, in nanometers) and a center wavelength;

the Fiber Bragg Gratings separated from one another along the optical fiber by a step size comprising a minimum distance $d_{min}$ (in millimeters);

the laser light source configured to generate the light pulses at a pulse wavelength comprising a pulse width $T_{pulse}$ (in nanoseconds) wherein $T_{pulse} \leq 0.01 * d_{min}$;

the laser light source further configured to step the pulse wavelength by less than FWHM/8;

the Fiber Bragg Gratings arranged into at least two different groupings of gratings in the optical fiber, the first grouping comprising a first constant step size between the gratings therein, and the second grouping comprising a second constant step size between the gratings therein;

wherein the first step size in millimeters differs from the second step size by greater than 1.1/FWHM; and processing logic to detect a signal comprising primary reflections and re-reflections from the Fiber Bragg Gratings and to filter out ripple in the signal by applying a low pass filter configured to pass at least the FWHM.

11. The sensor system of claim 10, wherein a number the plurality of the Fiber Bragg Gratings in the optical fiber exceeds 100, and the step size between any given adjacent pair of the Fiber Bragg Gratings differs from the step size between at least 80% of other Fiber Bragg Gratings adjacent pairs by at least 1.1/FWHM.

12. The sensor system of claim 10, with a variability of the step size for the Fiber Bragg Gratings that is less than or equal to 20% of an average value of the step size for the Fiber Bragg Gratings.

13. The sensor system of claim 10, wherein the reflections from the Fiber Bragg Gratings are directed to a detector via an optical coupler on the optical fiber.

14. The sensor system of claim 10, configured to step the pulse wavelength by applying a thermo-electric cooler to the laser light source.

15. The sensor system of claim 10, configured to step the pulse wavelength in picometers by less than $4/T_{pulse}$.

16. The sensor system of claim 10, the processing logic further configured to estimate from the ripple a power of the re-reflections and to correct a measurement of the primary reflections based on the estimate.

17. The sensor system of claim 16, wherein the estimate of power is applied to generate an alarm condition upon satisfying a threshold level.

18. The sensor system of claim 10, wherein a center wavelength is varied among the Fiber Bragg Gratings.

19. The sensor system of claim 18, wherein the center wavelength varies across pairs of adjacent Fiber Bragg Gratings.

20. The sensor system of claim 18, wherein the center wavelength varies by at least the FWHM of the Fiber Bragg Gratings.

* * * * *